United States Patent
Yamazaki et al.

(10) Patent No.: US 12,392,994 B2
(45) Date of Patent: Aug. 19, 2025

(54) CAMERA OPTICAL LENS

(71) Applicant: AAC Optics (Suzhou) Co., Ltd., Suzhou (CN)

(72) Inventors: Kaoru Yamazaki, Osaka (JP); Lei Zhang, Shenzhen (CN)

(73) Assignee: AAC Optics (Suzhou) Co., Ltd., Suzhou (CN)

( * ) Notice: Subject to any disclaimer, the term of this patent is extended or adjusted under 35 U.S.C. 154(b) by 807 days.

(21) Appl. No.: 17/549,902

(22) Filed: Dec. 14, 2021

(65) Prior Publication Data
US 2022/0206258 A1    Jun. 30, 2022

(30) Foreign Application Priority Data
Dec. 29, 2020 (CN) .......................... 202011607404.9

(51) Int. Cl.
    *G02B 9/64*      (2006.01)
    *G02B 13/00*     (2006.01)

(52) U.S. Cl.
    CPC ........... *G02B 9/64* (2013.01); *G02B 13/0045* (2013.01)

(58) Field of Classification Search
    CPC .............................. G02B 9/64; G02B 13/0045
    USPC ................... 359/708, 713, 755, 754
    See application file for complete search history.

(56) References Cited

U.S. PATENT DOCUMENTS

| | | | | |
|---|---|---|---|---|
| 9,958,649 B2 * | 5/2018 | Lai | .................. | G02B 13/0045 |
| 10,670,837 B2 * | 6/2020 | Kuo | .................. | G02B 13/0045 |
| 11,586,011 B2 * | 2/2023 | Hsieh | .................. | G02B 9/64 |
| 2014/0376105 A1 * | 12/2014 | Sekine | ............... | G02B 3/02 |
| | | | | 359/708 |
| 2019/0187414 A1 * | 6/2019 | Zhang | ............... | G02B 9/62 |
| 2021/0041670 A1 * | 2/2021 | Yang | ............... | G02B 9/64 |
| 2021/0405327 A1 * | 12/2021 | Dai | ............... | G02B 9/64 |
| 2022/0137369 A1 * | 5/2022 | Hsu | ............... | G02B 9/64 |
| | | | | 359/708 |

OTHER PUBLICATIONS

Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007).*

* cited by examiner

*Primary Examiner* — Pinping Sun
*Assistant Examiner* — Andrew R Wright
(74) *Attorney, Agent, or Firm* — Wiersch Law Group

(57) ABSTRACT

The present invention discloses a camera optical lens with seven-piece lens including, from an object side to an image side in sequence, a first lens having a positive refractive power, a second lens having a negative refractive power, a third lens having a positive refractive power, a fourth lens having a negative refractive power, a fifth lens having a positive refractive power, a sixth lens having a positive refractive power and a seventh lens having a negative refractive power. The camera optical lens satisfies the following conditions: $1.30 \leq f1/f \leq 2.00$, $5.00 \leq d1/d2 \leq 8.01$, and $1.00 \leq d4/d6 \leq 5.00$. The camera optical lens according to the present invention has excellent optical characteristics, such as large aperture, wide angle, and ultra-thin.

19 Claims, 9 Drawing Sheets

CAMERA OPTICAL LENS

FIELD OF THE PRESENT INVENTION

The present invention relates to the field of optical lens, and more particularly, to a camera optical lens suitable for handheld terminal devices, such as smart phones and digital cameras, monitors or PC lenses.

DESCRIPTION OF RELATED ART

In recent years, with the rise of various smart devices, the demand for miniaturized camera optics has been increasing, and the pixel size of photosensitive devices has shrunk, coupled with the development trend of electronic products with good functions, thin and portable appearance, Therefore, miniaturized imaging optical lenses with good image quality have become the mainstream in the current market. In order to obtain better imaging quality, a multi-piece lens structure is often used. Moreover, with the development of technology and the increase of diversified needs of users, as the pixel area of the photosensitive device continues to shrink and the system's requirements for image quality continue to increase, the seven-piece lenses structure gradually appears in the lens design. There is an urgent need for a wide-angle imaging lens with excellent optical characteristics, small size, and fully corrected aberrations.

SUMMARY

In the present invention, a camera optical lens has excellent optical characteristics with large aperture stop, ultra-thin characteristic and wide angled.

According to one aspect of the present invention, a camera optical lens comprising, from an object side to an image side in sequence, a first lens having a positive refractive power, a second lens having a negative refractive power, a third lens having a positive refractive power, a fourth lens having a negative refractive power, a fifth lens having a positive refractive power, a sixth lens having a positive refractive power and a seventh lens having a negative refractive power. Herein the camera optical lens satisfies the following conditions: $1.30 \le f1/f6 \le 2.00$, $5.00 \le d1/d2 \le 8.01$, and $1.00 \le d4/d6 \le 5.00$. f denotes a focal length of the optical camera lens, f1 denotes a focal length of the first lens, d1 denotes an on-axis thickness of the first lens, d2 denotes an on-axis distance from an image side surface of the first lens to an object side surface of the second lens, d4 denotes an on-axis distance from an image side surface of the second lens to an object side surface of the third lens, and d6 denotes an on-axis distance from an image side surface of the third lens to an object side surface of the fourth lens.

As an improvement, the camera optical lens further satisfies that the first lens has an object side surface being convex in a paraxial region and the image side surface of the first lens is concave in the paraxial region. The camera optical lens further satisfies the following conditions: $-4.08 \le (R1+R2)/(R1-R2) \le -1.07$ and $0.04 \le d1/TTL \le 0.21$. R1 denotes a central curvature radius of the object side surface of the first lens, R2 denotes a central curvature radius of the image side surface of the first lens, and TTL denotes a total optical length from the object side surface of the first lens of the camera optical lens to an image surface of the camera optical lens along an optical axis.

As an improvement, the camera optical lens further satisfies that the following conditions: $-2.55 \le (R1+R2)/(R1-R2) \le -1.33$ and $0.07 \le d1/TTL \le 0.17$.

As an improvement, the camera optical lens further satisfies that the object side surface of the second lens is convex in a paraxial region and the image side surface of the second lens is concave in the paraxial region. The camera optical lens further satisfies the following conditions: $-5.66 \le f2/f \le -1.18$, $1.77 \le (R3+R4)/(R3-R4) \le 6.49$, and $0.02 \le d3/TTL \le 0.17$. f2 denotes a focal length of the second lens, R3 denotes a central curvature radius of the object side surface of the second lens, R4 denotes a central curvature radius of the image side surface of the second lens, d3 denotes an on-axis thickness of the second lens, and TTL denotes a total optical length from an object side surface of the first lens of the camera optical lens to an image surface of the camera optical lens along an optical axis.

As an improvement, the camera optical lens further satisfies that the following conditions: $-3.53 \le f2/f \le -1.47$, $2.83 \le (R3+R4)/(R3-R4) \le 5.19$, and $0.03 \le d3/TTL \le 0.14$.

As an improvement, the camera optical lens further satisfies that the object side surface of the third lens is convex in a paraxial region and the image side surface of the third lens is convex in the paraxial region. The camera optical lens further satisfies the following conditions: $0.63 \le f3/f \le 2.48$, $-1.41 \le (R5+R6)/(R5-R6) \le -0.19$, and $0.04 \le d5/TTL \le 0.13$. f3 denotes a focal length of the third lens, R5 denotes a central curvature radius of the object side surface of the third lens, R6 denotes a central curvature radius of an image side surface of the third lens, d5 denotes an on-axis thickness of the third lens, and TTL denotes a total optical length from an object side surface of the first lens of the camera optical lens to an image surface of the camera optical lens along an optical axis.

As an improvement, the camera optical lens further satisfies the following conditions: $1.01 \le f3/f \le 1.99$, $-0.88 \le (R5+R6)/(R5-R6) \le -0.24$, and $0.06 \le d5/TT \le 0.10$.

As an improvement, the camera optical lens further satisfies that the object side surface of the fourth lens is concave in a paraxial region and the fourth lens further has an image side surface being convex in the paraxial region. The camera optical lens further satisfies the following conditions: $-142.89 \le f4/f \le -4.19$, $-27.29 \le (R7+R8)/(R7-R8) \le -1.42$, and $0.02 \le d7/TTL \le 0.11$. f4 denotes a focal length of the fourth lens, R7 denotes a central curvature radius of the object side surface of the fourth lens, R8 denotes a central curvature radius of the image side surface of the fourth lens, d7 denotes an on-axis thickness of the fourth lens, and TTL denotes a total optical length from an object side surface of the first lens of the camera optical lens to an image surface of the camera optical lens along an optical axis.

As an improvement, the camera optical lens further satisfies the following conditions: $-89.31 \le f4/f \le -5.24$, $-17.05 \le (R7+R8)/(R7-R8) \le -1.77$, and $0.04 \le d7/TTL \le 0.09$.

As an improvement, the camera optical lens further satisfies that the fifth lens has an object side surface being convex in a paraxial region and an image side surface being concave in the paraxial region. The camera optical lens further satisfies the following conditions: $37.92 \le f5/f \le 268.10$, $-641.90 \le (R9+R10)/(R9-R10) \le 1012.65$, and $0.03 \le d9/TTL \le 0.10$. f5 denotes a focal length of the fifth lens, R9 denotes a central curvature radius of the object side surface of the fifth lens, R10 denotes a central curvature radius of the image side surface of the fifth lens, d9 denotes an on-axis thickness of the fifth lens, and TTL denotes a total optical length from an object side surface of the first lens of the camera optical lens to an image surface of the camera optical lens along an optical axis.

As an improvement, the camera optical lens further satisfies that the following conditions: $60.68 \leq f5/f \leq 214.48$, $-401.19 \leq (R9+R10)/(R9-R10) \leq 810.12$, and $0.046 \leq d9/TTL \leq 0.08$.

As an improvement, the camera optical lens further satisfies that the sixth lens has an object side surface being convex in a paraxial region and an image side surface being concave in the paraxial region, the camera optical lens further satisfies the following conditions: $0.88 \leq f6/f \leq 5.01$, $-23.98 \leq (R11+R12)/(R11-R12) \leq -4.24$, and $0.05 \leq d11/TTL \leq 0.18$. f6 denotes a focal length of the sixth lens, R11 denotes a central curvature radius of the object side surface of the sixth lens, R12 denotes a central curvature radius of the image side surface of the sixth lens, d11 denotes an on-axis thickness of the sixth lens, and TTL denotes a total optical length from an object side surface of the first lens of the camera optical lens to an image surface of the camera optical lens along an optical axis.

As an improvement, the camera optical lens further satisfies the following conditions: $1.40 \leq f6/f \leq 4.01$, $-14.99 \leq (R11+R12)/(R11-R12) \leq -5.29$, and $0.07 \leq d11/TTL \leq 0.14$.

As an improvement, the camera optical lens further satisfies that the seventh lens has an object side surface being convex in a paraxial region and an image side surface being concave in the paraxial region. The camera optical lens further satisfies the following conditions: $-2.73 \leq f7/f \leq -0.79$, $0.63 \leq (R13+R14)/(R13-R14) \leq 5.49$, and $0.03 \leq d13/TTL \leq 0.09$. f7 denotes a focal length of the seventh lens, R13 denotes a central curvature radius of the object side surface of the seventh lens, R14 denotes a central curvature radius of the image side surface of the seventh lens d13 denotes an on-axis thickness of the seventh lens, and TTL denotes a total optical length from an object side surface of the first lens of the camera optical lens to an image surface of the camera optical lens along an optical axis.

As an improvement, the camera optical lens further satisfies the following conditions: $-1.71 \leq f7/f \leq -0.98$, $1.01 \leq (R13+R14)/(R13-R14) \leq 4.39$, and $0.04 \leq d13/TTL \leq 0.07$.

As an improvement, the camera optical lens further satisfies the following conditions: $1.66 \leq f12/f \leq 6.56$. f12 denotes a combined focal length of the first lens and the second lens.

As an improvement, the camera optical lens further satisfies that an FNO of the camera optical lens is less than or equal to 2.06. FNO denotes a ratio of an effective focal length of the camera optical lens to an entrance pupil diameter.

As an improvement, the camera optical lens further satisfies that an FOV of the camera optical lens is greater than or equal to 68.28°. FOV denotes a field of view of the camera optical lens in a diagonal direction.

As an improvement, the camera optical lens further satisfies the following conditions: $TTL/IH \leq 1.93$. IH denotes an image height of the camera optical lens, and TTL denotes a total optical length from an object side surface of the first lens of the camera optical lens to an image surface of the camera optical lens along an optical axis.

BRIEF DESCRIPTION OF THE DRAWINGS

In order to explain the technical solutions in the embodiments of the present invention more clearly, the following will briefly introduce the drawings that need to be used in the description of the embodiments. Obviously, the drawings in the following description are only some embodiments of the present invention. For those of ordinary skill in the art, without creative work, other drawings can be obtained based on these drawings, among which.

DETAILED DESCRIPTION OF THE EXEMPLARY EMBODIMENTS

In order to make the objects, technical solutions, and advantages of the present invention more apparent, the embodiments of the present invention will be described in detail below. However, it will be apparent to the one skilled in the art that, in the various embodiments of the present invention, a number of technical details are presented in order to provide the reader with a better understanding of the invention. However, the technical solutions claimed in the present invention can be implemented without these technical details and various changes and modifications based on the following embodiments.

Embodiment 1

Figure 1:
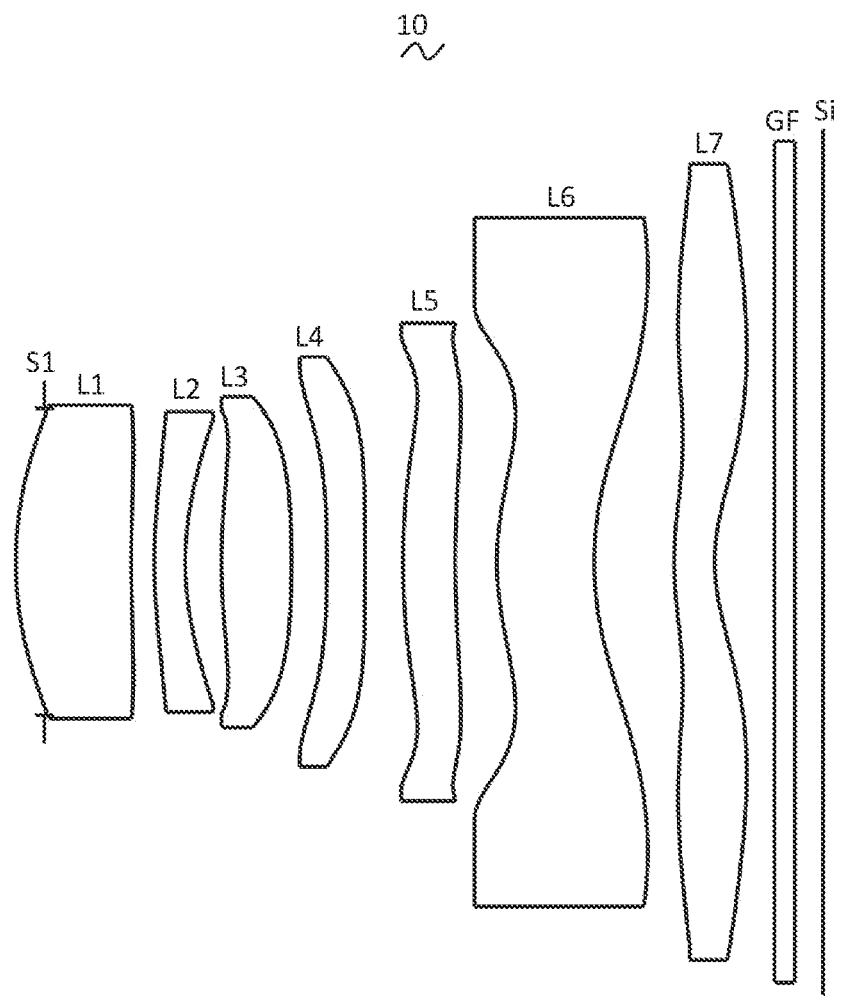
FIG. 1 is a schematic diagram of a structure of a camera optical lens in accordance with Embodiment 1 of the present invention.

As referring to the accompanying drawings, the present invention provides a camera optical lens 10. FIG. 1 shows the camera optical lens 10 according to embodiment 1 of the present invention. The camera optical lens comprises seven lenses. Specifically, from an object side to an image side, the camera optical lens 10 comprises in sequence: an aperture S1, a first lens L1, a second lens L2, a third lens L3, a fourth lens L4, a fifth lens L5, a sixth lens L6 and a seventh lens L7. Optical elements like optical filter GF can be arranged between the seventh lens L7 and an image surface S1.

The first lens L1 is made of plastic material, the second lens L2 is made of plastic material, the third lens L3 is made of plastic material, the fourth lens L4 is made of plastic material, the fifth lens L5 is made of plastic material, the sixth lens L6 is made of plastic material, and the seventh lens L7 is made of plastic material. In other optional embodiments, each lens may also be made of other materials.

A focal length of the camera optical lens 10 is defined as f, and a focal length of the first lens L1 is defined as f1. The camera optical lens 10 further satisfies the following condition: $1.30 \leq f1/f \leq 2.00$, which specifies a positive refractive power of the first lens L1. When the value is lower than 1.30, although the lens develop toward ultra-thin, the positive refractive power of the first lens L1 is too high, so that the aberration cannot be corrected and it is bad for producing wide angle lens. When the value is higher than 2.00, the positive refractive power of the first lens L1 is too weaker, the lens cannot develop toward ultra-thin.

An on-axis thickness of the first lens L1 is defined as d1, and an on-axis distance from an image side surface of the first lens L1 to an object side surface of the second lens L2 is defined as d2. The camera optical lens further satisfies the following condition: $5.00 \leq d1/d2 \leq 8.00$, which specifies a ratio of the on-axis thickness of the first lens L1 to the on-axis distance from the image side surface of the first lens L1 to the object side surface of the second lens L2. When the condition is satisfied, it benefits for developing towards a wide-angle lens.

An on-axis distance from an image side surface of the second lens L2 to an object side surface of the third lens L3 is defined as d4, and an on-axis distance from an image side surface of the third lens L3 to an object side surface of the fourth lens L4 is defined as d6. The camera optical lens 10 further satisfies the following condition: $1.00 \leq d4/d6 \leq 5.00$, which specifies a ratio of the on-axis distance from the image side surface of the second lens L2 to the object side surface of the third lens L3 to the on-axis distance from the image side surface of the third lens L3 to the object side surface of the fourth lens L4. When the condition is satisfied, it benefits for achieving the ultra-thin performance.

In the present embodiment, an object side surface of the first lens L1 is convex in a paraxial region, the image side surface of the first lens L1 is concave in the paraxial region, and the first lens L1 has a positive refractive power. In other optional embodiments, the object side surface and the image side surface of the first lens L1 can also be arranged as other concave side surface or convex side surface, such as, concave object side surface and convex image side surface and so on.

The central curvature radius of the object side surface of the first lens L1 is defined as R1, and a central curvature radius of the image side surface of the first lens L1 is defined as R2. The camera optical lens 10 further satisfies the following condition: $-4.08 \leq (R1+R2)/(R1-R2) \leq -1.07$. This condition reasonably controls a shape of the first lens L1, so that the first lens L1 can effectively correct a spherical aberration of the camera optical lens 10. Preferably, the following condition shall be satisfied, $-2.556 (R1+R2)/(R1-R2) \leq -1.33$.

The on-axis thickness of the first lens L1 is defined as d1. A total optical length from the object side surface of the first lens L1 to the image surface Si of the camera optical lens 10 along an optical axis is defined as TTL. The camera optical lens 10 further satisfies the following condition: $0.04 \leq d1/TTL \leq 0.21$. When the condition is satisfied, it benefits for realizing the ultra-thin effect. Preferably, the following condition shall be satisfied, $0.07 \leq d1/TTL \leq 0.17$.

In the present embodiment, the object side surface of the second lens L2 is convex in the paraxial region, the image side surface of the second lens L2 is concave in the paraxial region, and the second lens L2 has a negative refractive power. In other optional embodiments, the object side surface and the image side surface of the second lens L2 can also be arranged as other concave side surface or convex side surface, such as, concave object side surface and convex image side surface and so on.

The focal length of the camera optical lens 10 is defined as f, and the focal length of the second lens L2 is defined as f2. The camera optical lens 10 further satisfies the following condition: $-5.66 \leq f2/f \leq -1.18$. It is beneficial for correcting an aberration of the camera optical lens 10 by controlling the negative refractive power of the second lens L2 being within reasonable range. Preferably, the following condition shall be satisfied, $-3.53 \leq f2/f \leq -1.47$.

A central curvature radius of the object side surface of the second lens L2 is defined as R3, and a central curvature radius of the image side surface of the second lens L2 is defined as R4. The camera optical lens 10 further satisfies the following condition: $1.77 \leq (R3+R4)/(R3-R4) \leq 6.49$, which specifies a shape of the second lens L2. When the condition is satisfied, as the camera optical lens 10 develops towards ultra-thin and wide-angle, it is beneficial for correcting an on-axis chromatic aberration. Preferably, the following condition shall be satisfied, $2.83 \leq (R3+R4)/(R3-R4) \leq 5.19$.

An on-axis thickness of the second lens L2 is defined as d3. The total optical length from the object side surface of the first lens L1 to the image surface Si of the camera optical lens 10 along the optical axis is defined as TTL. The camera optical lens 10 further satisfies the following condition: $0.02 \leq d3/TTL \leq 0.17$. When the condition is satisfied, it is beneficial for producing ultra-thin lenses. Preferably, the following condition shall be satisfied, $0.03 \leq d3/TTL \leq 0.14$.

In the present embodiment, the object side surface of the third lens L3 is convex in the paraxial region, the image side surface of the third lens L3 is convex in the paraxial region, and the third lens L3 has a positive refractive power. In other optional embodiments, the object side surface and the image side surface of the third lens L3 can also be arranged as other concave side surface or convex side surface, such as, concave object side surface and concave image side surface and so on.

The focal length of the camera optical lens 10 is defined as f, and the focal length of the third lens L3 is defined as f3. The camera optical lens 10 further satisfies the following condition: $0.63 \leq f3/f \leq 2.48$. By a reasonable distribution of the refractive power, which makes it is possible that the camera optical lens 10 has an excellent imaging quality and a lower sensitivity. Preferably, the following condition shall be satisfied, $1.01 \leq f3/f \leq 1.99$.

A central curvature radius of the object side surface of the third lens L3 is defined as R5, and a central curvature radius of the image side surface of the third lens L3 is defined as R6. The camera optical lens 10 further satisfies the following condition: $-1.41 \leq (R5+R6)/(R5-R6) \leq -0.19$, which specifies a shape of the third lens L3. It is beneficial for molding the third lens L3. When the condition is satisfied, a degree of deflection of light passing through the lens can be alleviated, and the aberration can be reduced effectively. Preferably, the following condition shall be satisfied, $-0.886 \leq (R5+R6)/(R5-R6) \leq -0.24$ An on-axis thickness of the third lens L3 is defined as d5. The total optical length from the object side surface of the first lens L1 to the image surface Si of the camera optical lens 10 along the optical axis is defined as TTL. The camera optical lens 10 further satisfies the following condition: $0.04 \leq d5/TTL \leq 0.13$, which benefits for realizing the ultra-thin effect. Preferably, the following condition shall be satisfied, $0.06 \leq d5/TTL \leq 0.10$.

In the present embodiment, the object side surface of the fourth lens L4 is concave in the paraxial region, an image side surface of the fourth lens L4 is convex in the paraxial region, and the fourth lens L4 has a negative refractive power. In other optional embodiments, the object side surface and the image side surface of the fourth lens L4 can also be arranged as other convex side surface or concave side surface, such as, convex object side surface and concave image side surface and so on.

The focal length of the camera optical lens 10 is defined as f, and a focal length of the fourth lens L4 is defined as f4. The camera optical lens 10 further satisfies the following condition: $-142.89 \leq f4/f \leq -4.19$. By a reasonable distribution of the refractive power, which makes it is possible that the camera optical lens 10 has the excellent imaging quality and the lower sensitivity. Preferably, the following condition shall be satisfied, $-89.31 \leq f4/f \leq -5.24$.

A curvature radius of the object side surface of the fourth lens L4 is defined as R7, and a central curvature radius of the image side surface of the fourth lens L4 is defined as R8. The camera optical lens further satisfies the following condition: $-27.29 \leq (R7+R8)/(R7-R8) \leq -1.42$, which specifies a shape of the fourth lens L4. When the condition is satisfied, as the development of ultra-thin and wide-angle lens, it is beneficial for solving the problems, such as correcting an off-axis aberration. Preferably, the following condition shall be satisfied, $-17.05 \leq (R7+R8)/(R7-R8) \leq -1.77$.

An on-axis thickness of the fourth lens L4 is defined as d7. The total optical length from the object side surface of the first lens L1 to the image surface Si of the camera optical lens 10 along the optical axis is defined as TTL. The camera optical lens 10 further satisfies the following condition: $0.02 \leq d7/TTL \leq 0.11$, which is beneficial for realizing the ultra-thin effect. Preferably, the following condition shall be satisfied, $0.04 \leq d7/TTL \leq 0.09$.

In the present embodiment, an object side surface of the fifth lens L5 is convex in the paraxial region, an image side surface of the fifth lens L5 is concave in the paraxial region, and the fifth lens L5 has a positive refractive power. In other optional embodiments, the object side surface and the image side surface of the fifth lens L5 can also be arranged as other convex side surface or concave side surface, such as, concave object side surface and convex image side surface and so on.

The focal length of the camera optical lens 10 is defined as f, and a focal length of the fifth lens L5 is defined as f5. The camera optical lens 10 further satisfies the following condition: $37.92 \leq f5/f \leq 268.10$. When the condition is satisfied, a light angle of the camera optical lens 10 can be smoothed effectively and the sensitivity of the tolerance can be reduced. Preferably, the following condition shall be satisfied, $60.68 \leq f5/f \leq 214.48$.

A central curvature radius of the object side surface of the fifth lens L5 is defined as R9, and a central curvature radius of the image side surface of the fifth lens L5 is defined as R10. The camera optical lens further satisfies the following condition: $-641.90 \leq (R9+R10)/(R9-R10) \leq 1012.65$, which specifies a shape of the fifth lens L5. When the condition is satisfied, as the development of the ultra-thin and wide-angle lenses, it is beneficial for correcting the off-axis aberration. Preferably, the following condition shall be satisfied, $-401.19 \leq (R9+R10)/(R9-R10) \leq 810.12$.

An on-axis thickness of the fifth lens L5 is defined as d9. The total optical length from the object side surface of the first lens L1 to the image surface Si of the camera optical lens 10 along the optical axis is defined as TTL. The camera optical lens 10 further satisfies the following condition: $0.03 \leq d9/TTL \leq 0.10$. When the condition is satisfied, it is beneficial for realizing the ultra-thin effect. Preferably, the following condition shall be satisfied, $0.04 \leq d9/TTL \leq 0.08$.

In the present embodiment, the object side surface of the sixth lens L6 is convex in the paraxial region, the image side surface of the sixth lens L6 is concave in the paraxial region, and the sixth lens L6 has a positive refractive power. In other optional embodiments, the object side surface and the image side surface of the sixth lens L6 can be arranged as other convex side surface or concave side surface, such as, concave object side surface and convex image side surface and so on.

The focal length of the camera optical lens 10 is defined as f, and a focal length of the sixth lens L6 is defined as f6. The camera optical lens further satisfies the following condition: $0.88 \leq f6/f \leq 5.01$. By a reasonable distribution of the refractive power, which makes it is possible the camera optical lens 10 has the excellent imaging quality and the lower sensitivity. Preferably, the following condition shall be satisfied, $1.40 \leq f6/f \leq 4.01$.

A central curvature radius of the object side surface of the sixth lens L6 is defined as R11, and a central curvature radius of the image side surface of the sixth lens L6 is defined as R12. The camera optical lens further satisfies the following condition: $-23.98 \leq (R11+R12)/(R11-R12) \leq -4.24$, which specifies a shape of the sixth lens L6. When the condition is satisfied, as the development of ultra-thin and wide-angle lens, it is beneficial for solving the problems, such as correcting the off-axis aberration. Preferably, the following condition shall be satisfied, $-14.99 \leq (R11+R12)/(R11-R12) \leq -5.29$.

An on-axis thickness of the sixth lens L6 is defined as d11. The total optical length from the object side surface of the first lens L1 to the image surface Si of the camera optical lens 10 along the optical axis is defined as TTL. The camera optical lens further satisfies the following condition: $0.05 \leq d11/TTL \leq 0.18$, which is beneficial for realizing the ultra-thin effect. Preferably, the following condition shall be satisfied, $0.07 \leq d11/TTL \leq 0.14$.

In the present embodiment, an object side surface of the seventh lens L7 is convex in the paraxial region, an image side surface of the seventh lens L7 is concave in the paraxial region, and the seventh lens L7 has a negative refractive power. In other optional embodiments, the object side surface and the image side surface of the seventh lens L7 can be arranged as other convex side surface or concave side surface, such as, concave object side surface and convex image side surface and so on.

The focal length of the camera optical lens 10 is defined as f, and a focal length of the seventh lens L7 is defined as f7. The camera optical lens 10 further satisfies the following condition: $-2.73 \leq f7/f \leq -0.79$. By a reasonable distribution of the refractive power, which makes it is possible the camera optical lens 10 has the excellent imaging quality and the lower sensitivity. Preferably, the following condition shall be satisfied, $-1.71 \leq f7/f \leq -0.98$.

A central curvature radius of the object side surface of the seventh lens L7 is defined as R13, and a central curvature radius of the image side surface of the seventh lens L7 is defined as R14. The camera optical lens 10 further satisfies the following condition: $0.63 \leq (R13+R14)/(R13-R14) \leq 5.49$, which specifies a shape of the seventh lens L7. When the condition is satisfied, as the development of ultra-thin and wide-angle lens, it is beneficial for correcting the off-axis aberration. Preferably, the following condition shall be satisfied, $1.01 \leq (R13+R14)/(R13-R14) \leq 4.39$.

An on-axis thickness of the seventh lens L7 is defined as d13. The total optical length from the object side surface of the first lens L1 to the image surface Si of the camera optical lens 10 along the optical axis is defined as TTL. The camera optical lens further satisfies the following condition: $0.03 \leq d13/TTL \leq 0.09$, which is beneficial for realizing the ultra-thin effect. Preferably, the following condition shall be satisfied, $0.04 \leq d13/TTL \leq 0.07$.

In the present embodiment, the focal length of the camera optical lens 10 is f, and a combined focal length of the first lens L1 and the second lens L2 is defined as f12. The camera optical lens 10 further satisfies the following condition: $1.66 \leq f12/f \leq 6.56$. This condition can eliminate aberration and distortion of the camera optical lens 10, reduce a back focal length of the camera optical lens 10, and maintain the miniaturization of the camera lens system group. Preferably, the following condition shall be satisfied, $2.65 \leq f12/f \leq 5.25$.

In the present embodiment, an F number (FNO) of the camera optical lens 10 is smaller than or equal to 2.26, thereby achieving a large aperture and good imaging performance. Preferably, the FNO of the camera optical lens 10 is smaller than or equal to 2.02.

In the present embodiment, a field of view of the camera optical lens 10 in a diagonal direction is defined as FOV. The FOV is greater than or equal to 68.28°, thereby achieving the wide-angle performance. Preferably, the FOV 10 is greater than or equal to 68.98°.

In the present embodiment, an image height of the camera optical lens 10 is defined as IH. The total optical length from the object side surface of the first lens L1 to the image surface Si of the camera optical lens 10 along an optical axis is defined as TTL. The camera optical lens 10 further satisfies the following condition: $TTL/IH \leq 1.93$, thereby achieving the ultra-thin performance. Preferably, the following condition shall be satisfied, $TTL/IH \leq 1.88$.

When the above conditions are satisfied, which makes it is possible the camera optical lens has excellent optical performances, and meanwhile can meet design requirements of ultra-thin, wide-angle and large aperture. According the characteristics of the camera optical lens 10, it is particularly suitable for a mobile camera lens component and a WEB camera lens composed of high pixel CCD, CMOS.

The following examples will be used to describe the camera optical lens 10 of the present invention. The symbols recorded in each example will be described as follows. The focal length, on-axis distance, central curvature radius, on-axis thickness, inflexion point position, and arrest point position are all in units of mm.

TTL: the total optical length from the object side surface of the first lens L1 to the image surface Si of the camera optical lens 10 along the optical axis, the unit of TTL is mm.

F number (FNO): a ratio of an effective focal length of the camera optical lens 10 to an entrance pupil diameter (ENPD).

Preferably, inflexion points and/or arrest points can also be arranged on the object side surface and/or image side surface of the lens, so that the demand for high quality imaging can be satisfied, the description below can be referred for specific implementable scheme.

The design information of the camera optical lens 10 in Embodiment 1 of the present invention is shown in the tables 1 and 2.

TABLE 1

| | R | d | | nd | | vd |
|---|---|---|---|---|---|---|
| S1 | ∞ | d0 = | −0.300 | | | |
| R1 | 3.739 | d1 = | 1.210 | nd1 | 1.5444 | v1 55.82 |
| R2 | 16.187 | d2 = | 0.241 | | | |
| R3 | 5.741 | d3 = | 0.325 | nd2 | 1.6700 | v2 19.39 |

TABLE 1-continued

| | R | d | | nd | | vd |
|---|---|---|---|---|---|---|
| R4 | 3.214 | d4 = | 0.380 | | | |
| R5 | 6.880 | d5 = | 0.733 | nd3 | 1.5444 | v3 55.82 |
| R6 | −12.290 | d6 = | 0.371 | | | |
| R7 | −14.769 | d7 = | 0.401 | nd4 | 1.5661 | v4 37.71 |
| R8 | −41.041 | d8 = | 0.398 | | | |
| R9 | 8.320 | d9 = | 0.545 | nd5 | 1.5661 | v5 37.71 |
| R10 | 8.372 | d10 = | 0.439 | | | |
| R11 | 3.018 | d11 = | 1.020 | nd6 | 1.5444 | v6 55.82 |
| R12 | 3.567 | d12 = | 0.836 | | | |
| R13 | 3.386 | d13 = | 0.425 | nd7 | 1.5661 | v7 37.71 |
| R14 | 1.933 | d14 = | 0.628 | | | |
| R15 | ∞ | d15 = | 0.210 | ndg | 1.5168 | vg 64.17 |
| R16 | ∞ | d16 = | 0.300 | | | | where, the meaning of the various symbols is as follows.

S1: aperture;
R: curvature radius of an optical surface, a central curvature radius for a lens;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the seventh lens L7;
R14: central curvature radius of the image side surface of the seventh lens L7;
R15: central curvature radius of an object side surface of the optical filter GF;
R16: curvature radius of an image side surface of the optical filter GF;
d: on-axis thickness of a lens and an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L5 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the optical filter GF;
d16: on-axis distance from the image side surface of the optical filter GF to the image surface;
nd: refractive index of d line (d-line is green light with a wavelength of 550 nm);
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF;

Table 2 shows the aspherical surface data of the camera optical lens 10 in Embodiment 1 of the present invention.

TABLE 2

| | Conic coefficient | Aspheric surface coefficients | | | | |
|---|---|---|---|---|---|---|
| | k | A4 | A6 | A8 | A10 | A12 |
| R1 | 7.9874E−01 | 9.1677E−05 | 4.3339E−03 | −7.6576E−03 | 8.4947E−03 | −5.9580E−03 |
| R2 | 2.9986E+01 | −1.9458E−02 | 1.2852E−02 | −2.7663E−03 | −3.0382E−03 | 2.8648E−03 |
| R3 | −1.0511E+01 | −3.8379E−02 | 3.1581E−02 | −9.1462E−03 | −3.7555E−03 | 5.7034E−03 |
| R4 | −1.5527E+00 | −1.7891E−02 | 1.8435E−02 | 7.4253E−03 | −2.7403E−02 | 3.1874E−02 |
| R5 | 1.5710E+01 | −2.7255E−02 | −2.0888E−02 | 1.4218E−02 | 8.6725E−03 | −3.6884E−02 |
| R6 | −5.4165E+00 | 3.1179E−02 | −1.2203E−01 | 1.4163E−01 | −1.0812E−01 | 5.4706E−02 |
| R7 | 2.9999E+01 | 7.4125E−02 | −1.6763E−01 | 1.6340E−01 | −9.6470E−02 | 3.6841E−02 |
| R8 | 1.0117E+01 | 5.3533E−02 | −1.1172E−01 | 9.4006E−02 | −5.6223E−02 | 2.4081E−02 |
| R9 | 1.0488E+01 | 3.3448E−02 | −4.0937E−02 | 2.6454E−02 | −1.2626E−02 | 3.9310E−03 |
| R10 | 7.1979E+00 | −6.3990E−02 | 2.2736E−02 | −4.5419E−04 | −3.5081E−03 | 1.4540E−03 |
| R11 | −1.8018E+00 | −7.9506E−03 | −6.5874E−03 | −1.0379E−04 | 1.4719E−04 | −3.8737E−05 |
| R12 | −4.5565E+00 | 7.1430E−02 | −3.5574E−02 | 7.3111E−03 | −8.1185E−04 | 4.2540E−05 |
| R13 | −1.1674E+01 | −6.1119E−02 | 1.7888E−02 | −2.3088E−03 | 1.5246E−04 | −3.5860E−06 |
| R14 | −5.1117E+00 | −4.0606E−02 | 1.2496E−02 | −2.7764E−03 | 4.2232E−04 | −4.3605E−05 |

| | Conic coefficient | Aspheric surface coefficients | | | |
|---|---|---|---|---|---|
| | k | A14 | A16 | A18 | A20 |
| R1 | 7.9874E−01 | 2.5935E−03 | −6.8051E−04 | 9.5900E−05 | −5.6209E−06 |
| R2 | 2.9986E+01 | −1.1371E−03 | 2.0807E−04 | −7.8756E−06 | −1.6336E−06 |
| R3 | −1.0511E+01 | −2.8869E−03 | 7.9006E−04 | −1.0631E−04 | 5.3409E−06 |
| R4 | −1.5527E+00 | −2.1749E−02 | 9.2277E−03 | −2.2486E−03 | 2.4552E−04 |
| R5 | 1.5710E+01 | 3.7264E−02 | −1.8954E−02 | 4.9634E−03 | −5.2554E−04 |
| R6 | −5.4165E+00 | −1.8607E−02 | 4.1348E−03 | −5.3301E−04 | 2.9859E−05 |
| R7 | 2.9999E+01 | −8.9493E−03 | 1.3188E−03 | −1.0589E−04 | 3.4486E−06 |
| R8 | 1.0117E+01 | −6.8645E−03 | 1.2138E−03 | −1.1899E−04 | 4.8914E−06 |
| R9 | 1.0488E+01 | −7.6488E−04 | 8.9981E−05 | −5.8760E−06 | 1.6375E−07 |
| R10 | 7.1979E+00 | −2.7704E−04 | 2.8383E−05 | −1.5176E−06 | 3.3291E−08 |
| R11 | −1.8018E+00 | 1.5835E−05 | −2.7710E−06 | 2.0350E−07 | −5.3983E−09 |
| R12 | −4.5565E+00 | 9.9959E−07 | −3.2487E−07 | 2.0592E−08 | −4.6002E−10 |
| R13 | −1.1674E+01 | −1.7452E−07 | 1.4934E−08 | −3.9332E−10 | 3.4015E−12 |
| R14 | −5.1117E+00 | 3.0098E−06 | −1.3211E−07 | 3.3111E−09 | −3.5886E−11 |

For convenience, an aspheric surface of each lens surface uses the aspheric surfaces shown in the below condition (1). However, the present invention is not limited to the aspherical polynomials form shown in the condition (1).

$$z = (cr^2)/\{1 + [1 - (k+1)(c^2r^2)]^{1/2}\} + A4r^4 + A6r^6 + A8r^8 + A10r^{10} + A12r^{12} + A14r^{14} + A16r^{16} + A18r^{18} + A20r^{20} \quad (1)$$

Where, K is a conic coefficient, A4, A6, A8, A10, A12, A14, A16, A18, A20 are aspheric surface coefficients. c is the curvature at the center of the optical surface. r is a vertical distance between a point on an aspherical curve and the optic axis, and z is an aspherical depth (a vertical distance between a point on an aspherical surface, having a distance of r from the optic axis, and a surface tangent to a vertex of the aspherical surface on the optic axis).

Table 3 and Table 4 show design data of inflexion points and arrest points of respective lens in the camera optical lens 10 according to Embodiment 1 of the present invention. P1R1 and P1R2 represent the object side surface and the image side surface of the first lens L1, P2R1 and P2R2 represent the object side surface and the image side surface of the second lens L2, P3R1 and P3R2 represent the object side surface and the image side surface of the third lens L3, P4R1 and P4R2 represent the object side surface and the image side surface of the fourth lens L4, P5R1 and P5R2 represent the object side surface and the image side surface of the fifth lens L5, P6R1 and P6R2 represent the object side surface and the image side surface of the sixth lens L6, and P7R1 and P7R2 represent the object side surface and the image side surface of the seventh lens L7. The data in the column named "inflexion point position" refers to vertical distances from inflexion points arranged on each lens surface to the optical axis of the camera optical lens 10. The data in the column named "arrest point position" refers to vertical distances from arrest points arranged on each lens surface to the optical axis of the camera optical lens 10.

TABLE 3

| | Number of inflexion points | Inflexion point position 1 | Inflexion point position 2 |
|---|---|---|---|
| P1R1 | 1 | 1.625 | / |
| P1R2 | 1 | 0.715 | / |
| P2R1 | 2 | 0.965 | 1.405 |
| P2R2 | 1 | 1.475 | / |
| P3R1 | 1 | 0.825 | / |
| P3R2 | 1 | 1.745 | / |
| P4R1 | 1 | 1.625 | / |
| P4R2 | 1 | 2.075 | / |
| P5R1 | 2 | 1.245 | 2.205 |
| P5R2 | 2 | 0.875 | 2.155 |
| P6R1 | 2 | 0.905 | 2.335 |
| P6R2 | 2 | 1.445 | 3.605 |
| P7R1 | 2 | 0.615 | 1.855 |
| P7R2 | 2 | 0.835 | 4.115 |

TABLE 4

| | Number of arrest points | Arrest point Position 1 | Arrest point position 2 |
|---|---|---|---|
| P1R1 | 0 | / | / |
| P1R2 | 1 | 1.195 | / |
| P2R1 | 0 | / | / |
| P2R2 | 0 | / | / |
| P3R1 | 1 | 1.255 | / |
| P3R2 | 0 | / | / |
| P4R1 | 0 | / | / |
| P4R2 | 0 | / | / |
| P5R1 | 1 | 1.755 | / |
| P5R2 | 2 | 1.625 | 2.375 |
| P6R1 | 1 | 1.555 | / |
| P6R2 | 1 | 3.075 | / |
| P7R1 | 2 | 1.315 | 2.495 |
| P7R2 | 1 | 2.245 | / |

Figure 2:
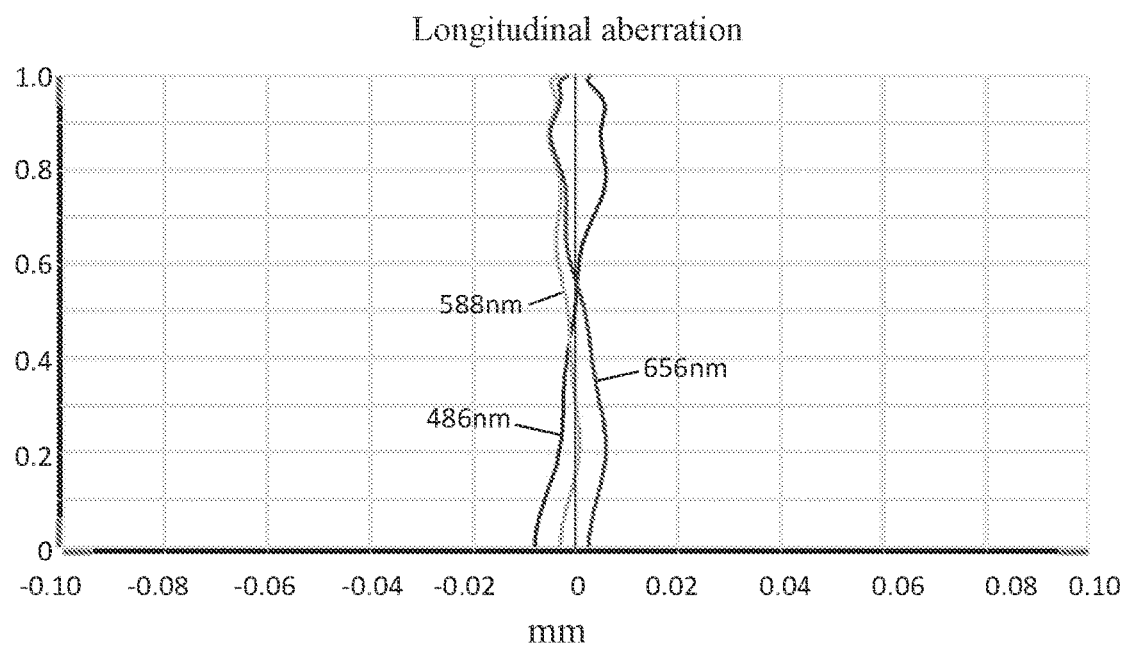
FIG. 2 is a schematic diagram of a longitudinal aberration of the camera optical lens shown in FIG. 1.
Figure 3:
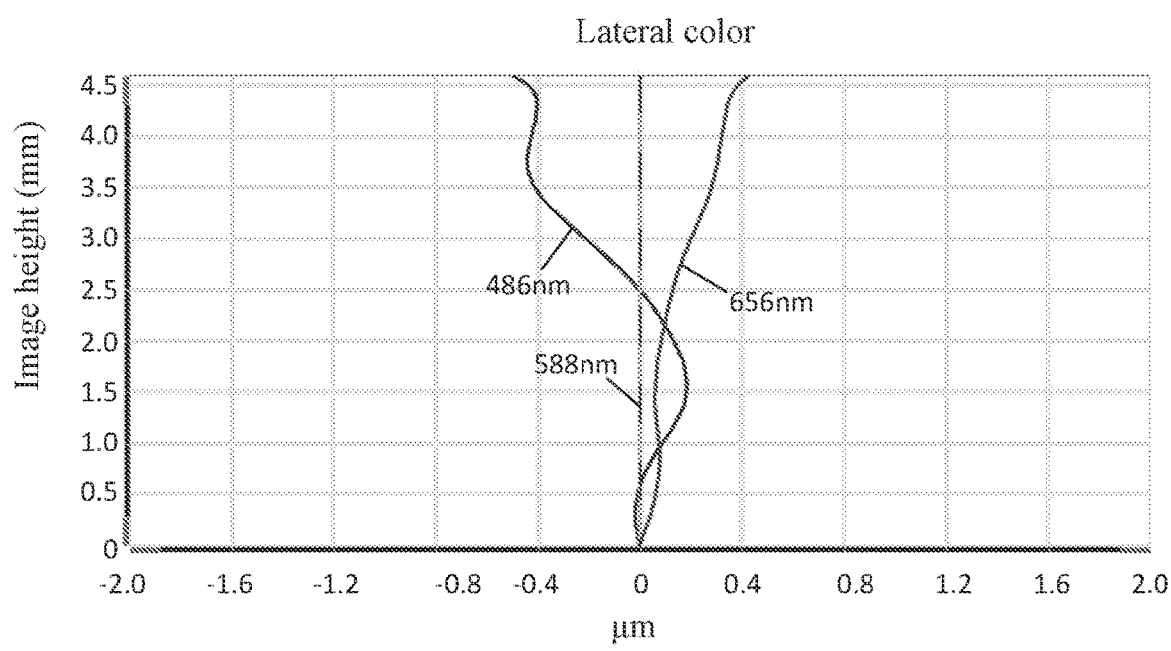
FIG. 3 is a schematic diagram of a lateral color of the camera optical lens shown in FIG. 1.
Figure 4:
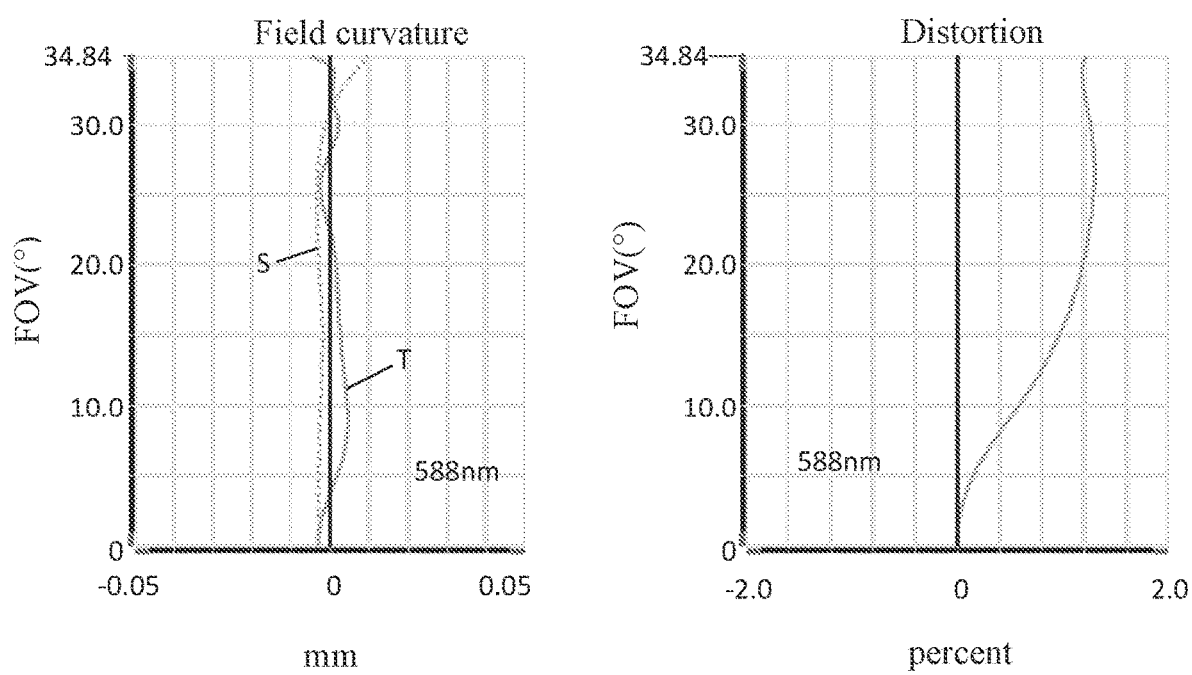
FIG. 4 is a schematic diagram of a field curvature and a distortion of the camera optical lens shown in FIG. 1.

FIG. 2 and FIG. 3 respectively illustrate a longitudinal aberration and a lateral color of light with wavelengths of 656 nm, 588 nm and 486 nm after passing the camera optical lens 10 according to Embodiment 1. FIG. 4 illustrates a field curvature and a distortion of light with a wavelength of 588 nm after passing the camera optical lens 10 according to Embodiment 1, in which a field curvature S is a field curvature in a sagittal direction and T is a field curvature in a tangential direction.

Table 13 shows various values of Embodiments 1, 2 and 3 and values corresponding to parameters which are specified in the above conditions.

As shown in Table 13, Embodiment 1 satisfies the above conditions.

In the present embodiment, the entrance pupil diameter (ENPD) of the camera optical lens 10 is 3.259 mm. The image height of 1.0H is 4.595 mm. The FOV is 69.68°. Thus, the camera optical lens 10 satisfies design requirements of large apertures, ultra-thin and wide-angle while the on-axis and off-axis aberrations are sufficiently corrected, thereby achieving excellent optical characteristics.

Embodiment 2

Embodiment 2 is basically the same as Embodiment 1, the meaning of its symbols is the same as that of Embodiment 1, in the following, only the differences are listed.

Figure 5:
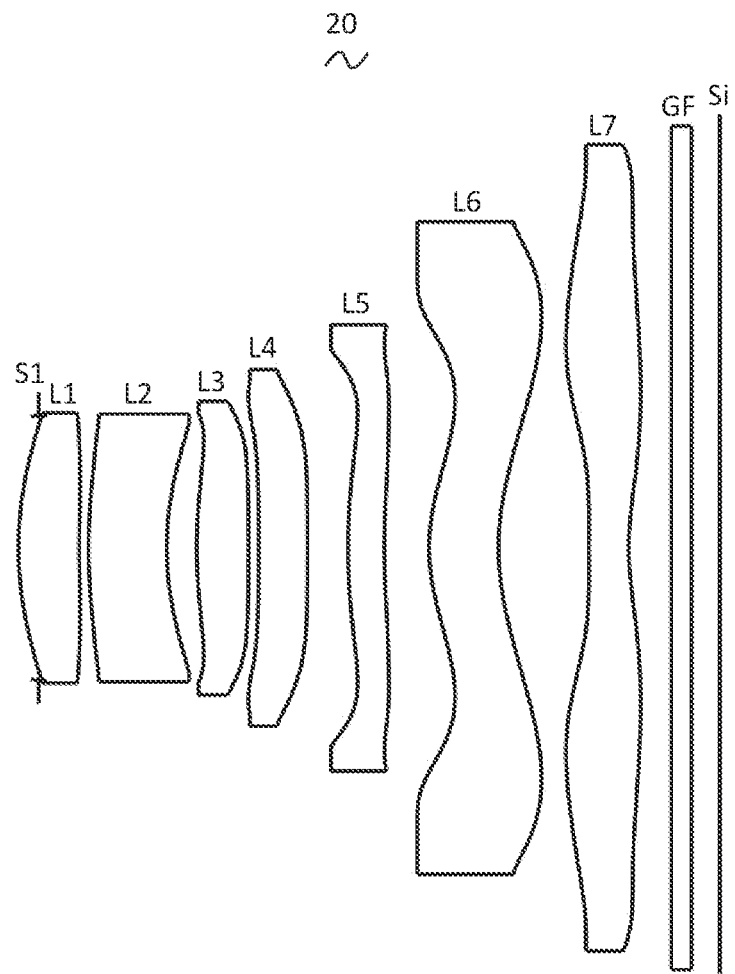
FIG. 5 is a schematic diagram of a structure of a camera optical lens in accordance with Embodiment 2 of the present invention.

FIG. 5 shows a schematic diagram of a structure of a camera optical lens 20 according to Embodiment 2 of the present invention. Table 5 and table 6 show the design data of a camera optical lens 20 in Embodiment 2 of the present invention.

TABLE 5

| | R | d | | nd | | vd |
|---|---|---|---|---|---|---|
| S1 | ∞ | d0 = | −0.212 | | | |
| R1 | 3.704 | d1 = | 0.635 | nd1 | 1.5444 | v1 55.82 |
| R2 | 13.238 | d2 = | 0.098 | | | |
| R3 | 4.948 | d3 = | 0.819 | nd2 | 1.6700 | v2 19.39 |
| R4 | 3.028 | d4 = | 0.317 | | | |
| R5 | 5.903 | d5 = | 0.542 | nd3 | 1.5444 | v3 55.82 |
| R6 | −33.610 | d6 = | 0.106 | | | |
| R7 | −29.921 | d7 = | 0.512 | nd4 | 1.5444 | v4 55.82 |
| R8 | −51.819 | d8 = | 0.425 | | | |
| R9 | 8.031 | d9 = | 0.380 | nd5 | 1.5661 | v5 37.71 |
| R10 | 8.008 | d10 = | 0.469 | | | |
| R11 | 2.028 | d11 = | 0.729 | nd6 | 1.5444 | v6 55.82 |
| R12 | 2.785 | d12 = | 0.945 | | | |
| R13 | 27.460 | d13 = | 0.420 | nd7 | 1.5444 | v7 55.82 |
| R14 | 3.164 | d14 = | 0.444 | | | |
| R15 | ∞ | d15 = | 0.210 | ndg | 1.5168 | vg 64.17 |
| R16 | ∞ | d16 = | 0.300 | | | |

Table 6 shows aspherical surface data of each lens of the camera optical lens 20 in Embodiment 2 of the present invention.

TABLE 6

| | Conic coefficient | Aspheric surface coefficients | | | | |
|---|---|---|---|---|---|---|
| | k | A4 | A6 | A8 | A10 | A12 |
| R1 | −5.3259E−01 | −7.5453E−03 | 1.2806E−02 | −4.0293E−02 | 7.0545E−02 | −7.6755E−02 |
| R2 | −3.0000E+01 | −6.7119E−02 | 5.3335E−02 | −1.2201E−02 | −3.3424E−02 | 5.4061E−02 |
| R3 | −1.3188E+01 | −5.6836E−02 | 6.0685E−02 | −6.0185E−02 | 7.3006E−02 | −7.6333E−02 |
| R4 | −1.7773E+00 | −1.8018E−02 | −2.9140E−03 | 1.9805E−02 | −1.7482E−02 | −1.6279E−03 |
| R5 | 1.4404E+01 | −2.2014E−02 | 6.0201E−03 | −3.5316E−02 | 3.8148E−02 | −1.9834E−02 |
| R6 | −3.0000E+01 | 1.2784E−02 | −3.6559E−02 | 1.1571E−02 | 2.2735E−02 | −5.4642E−02 |
| R7 | 3.0000E+01 | 3.1696E−02 | −1.0585E−01 | 1.4590E−01 | −1.3235E−01 | 7.1309E−02 |
| R8 | −2.9951E+01 | 2.6071E−02 | −1.1238E−01 | 1.3451E−01 | −1.0211E−01 | 4.9259E−02 |
| R9 | 1.0932E+01 | 5.0475E−02 | −1.0860E−01 | 9.8517E−02 | −5.4615E−02 | 1.9131E−02 |
| R10 | 7.2610E+00 | −1.6232E−02 | −3.9758E−02 | 4.4071E−02 | −1.9698E−02 | 3.9961E−03 |
| R11 | −3.0694E+00 | −4.2443E−02 | 5.3442E−03 | −2.1269E−03 | 1.0728E−03 | −4.1743E−04 |
| R12 | −6.6785E+00 | −5.2506E−05 | −3.0105E−03 | 1.0556E−03 | −2.7206E−04 | 4.7160E−05 |
| R13 | −1.2909E+01 | −1.0492E−01 | 4.6129E−02 | −9.9956E−03 | 1.3233E−03 | −1.1408E−04 |
| R14 | −1.2253E+01 | −4.9812E−02 | 1.6983E−02 | −3.4744E−03 | 4.5521E−04 | −3.8713E−05 |

| | Conic coefficient | Aspheric surface coefficients | | | |
|---|---|---|---|---|---|
| | k | A14 | A16 | A18 | A20 |
| R1 | −5.3259E−01 | 5.2394E−02 | −2.1839E−02 | 5.0750E−03 | −5.0392E−04 |
| R2 | −3.0000E+01 | −4.2380E−02 | 1.9171E−02 | −4.7662E−03 | 5.0452E−04 |
| R3 | −1.3188E+01 | 5.3727E−02 | −2.3285E−02 | 5.6022E−03 | −5.7249E−04 |
| R4 | −1.7773E+00 | 1.3252E−02 | −1.0104E−02 | 3.2930E−03 | −4.0781E−04 |
| R5 | 1.4404E+01 | −2.9276E−03 | 8.6458E−03 | −4.0956E−03 | 6.6484E−04 |
| R6 | −3.0000E+01 | 4.9113E−02 | −2.2550E−02 | 5.2793E−03 | −4.9604E−04 |
| R7 | 3.0000E+01 | −2.1635E−02 | 3.5201E−03 | −2.6414E−04 | 5.1363E−06 |
| R8 | −2.9951E+01 | −1.4907E−02 | 2.7255E−03 | −2.7268E−04 | 1.1373E−05 |
| R9 | 1.0932E+01 | −4.4864E−03 | 7.0019E−04 | −6.6117E−05 | 2.8630E−06 |

TABLE 6-continued

| | | | | |
|---|---|---|---|---|
| R10 | 7.2610E+00 | −2.0193E−04 | −5.6823E−05 | 9.7768E−06 | −4.6700E−07 |
| R11 | −3.0694E+00 | 9.4769E−05 | −1.1523E−05 | 7.0533E−07 | −1.7196E−08 |
| R12 | −6.6785E+00 | −5.3725E−06 | 3.8631E−07 | −1.5917E−08 | 2.8811E−10 |
| R13 | −1.2909E+01 | 6.4639E−06 | −2.3291E−07 | 4.8431E−09 | −4.4201E−11 |
| R14 | −1.2253E+01 | 2.1272E−06 | −7.2766E−08 | 1.4019E−09 | −1.1527E−11 |

Table 7 and table 8 show design data of inflexion points and arrest points of respective lens in the camera optical lens 20 according to Embodiment 2 of the present invention.

TABLE 7

| | Number of inflexion points | Inflexion point position 1 | Inflexion point position 2 | Inflexion point position 3 |
|---|---|---|---|---|
| P1R1 | 1 | 1.375 | / | / |
| P1R2 | 1 | 0.345 | / | / |
| P2R1 | 1 | 1.235 | / | / |
| P2R2 | 1 | 1.145 | / | / |
| P3R1 | 1 | 0.785 | / | / |
| P3R2 | 1 | 1.465 | / | / |
| P4R1 | 1 | 1.325 | / | / |
| P4R2 | 1 | 1.745 | / | / |
| P5R1 | 2 | 0.945 | 2.005 | / |
| P5R2 | 2 | 0.605 | 1.905 | / |
| P6R1 | 2 | 0.855 | 2.285 | / |
| P6R2 | 2 | 1.305 | 3.275 | / |
| P7R1 | 3 | 0.175 | 1.355 | 3.405 |
| P7R2 | 3 | 0.655 | 2.665 | 3.545 |

TABLE 8

| | Number of arrest points | Arrest point position 1 | Arrest point position 2 |
|---|---|---|---|
| P1R1 | 0 | / | / |
| P1R2 | 1 | 0.695 | / |
| P2R1 | 0 | / | / |
| P2R2 | 0 | / | / |
| P3R1 | 1 | 1.145 | / |
| P3R2 | 0 | / | / |
| P4R1 | 1 | 1.605 | / |
| P4R2 | 0 | / | / |
| P5R1 | 1 | 1.425 | / |
| P5R2 | 2 | 1.475 | 2.165 |
| P6R1 | 1 | 1.575 | / |
| P6R2 | 1 | 2.445 | / |
| P7R1 | 2 | 0.305 | 2.175 |
| P7R2 | 1 | 1.655 | / |

Figure 6:
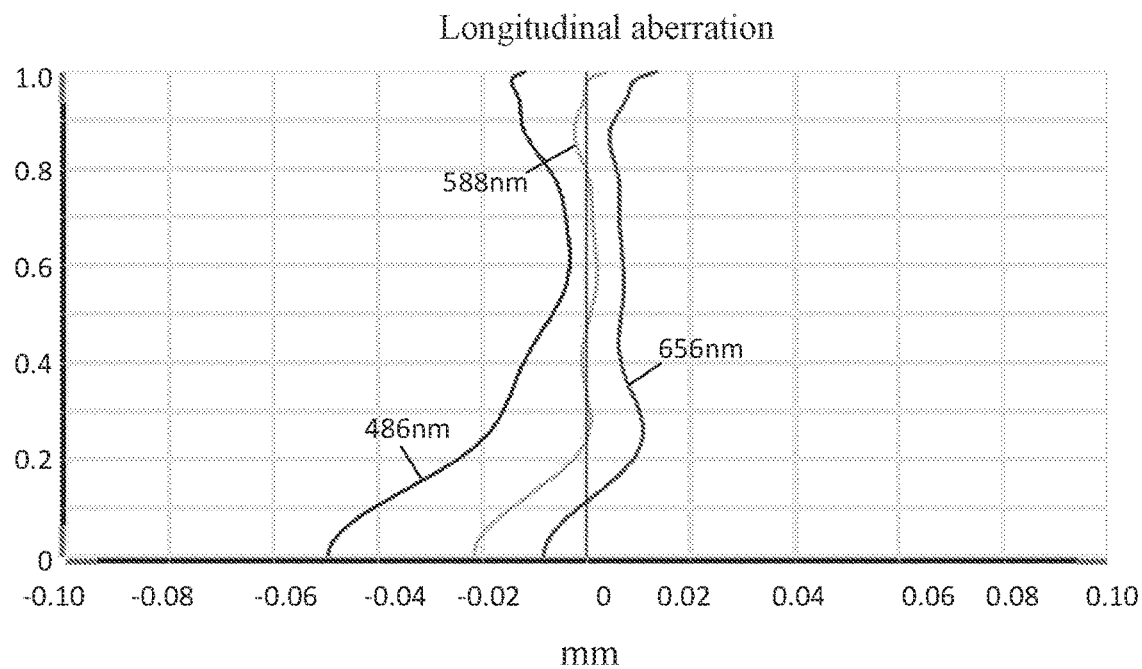
FIG. 6 is a schematic diagram of a longitudinal aberration of the camera optical lens shown in FIG. 5.
Figure 7:
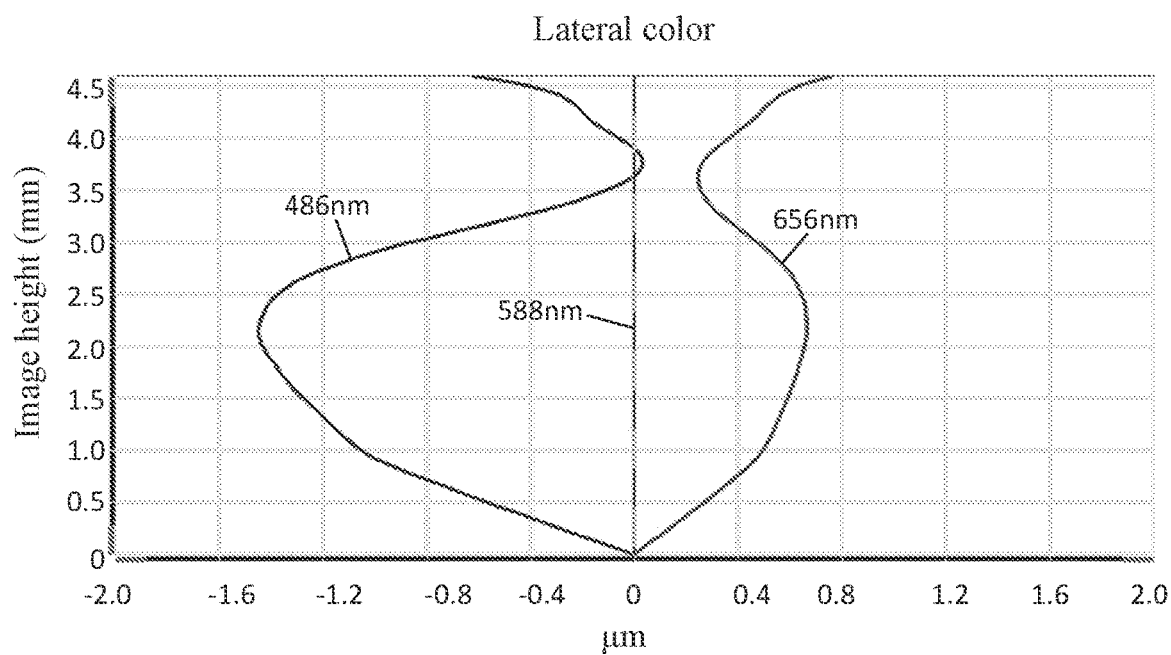
FIG. 7 is a schematic diagram of a lateral color of the camera optical lens shown in FIG. 5.
Figure 8:
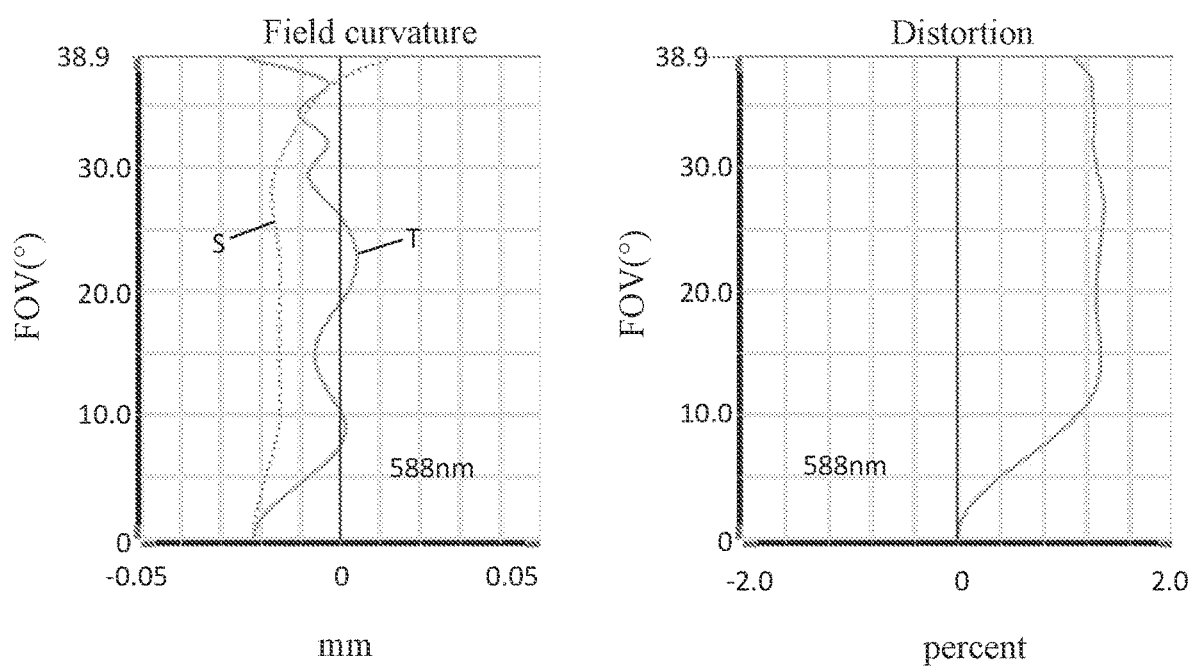
FIG. 8 is a schematic diagram of a field curvature and a distortion of the camera optical lens shown in FIG. 5.

FIG. 6 and FIG. 7 respectively illustrate a longitudinal aberration and a lateral color of light with wavelengths of 656 nm, 588 nm and 486 nm after passing the camera optical lens 20 according to Embodiment 2. FIG. 8 illustrates a field curvature and a distortion of light with a wavelength of 588 nm after passing the camera optical lens 10 according to Embodiment 2, in which a field curvature S is a field curvature in a sagittal direction and T is a field curvature in a tangential direction.

As shown in Table 13, Embodiment 2 satisfies the above conditions.

In the present embodiment, an entrance pupil diameter (ENPD) of the camera optical lens 20 is 2.798 mm. An image height of 1.0H is 4.595 mm. An FOV is 77.86°. Thus, the camera optical lens 20 satisfies design requirements of large aperture, ultra-thin and wide-angle while the on-axis and off-axis aberrations are sufficiently corrected, thereby achieving excellent optical characteristics.

Embodiment 3

Embodiment 3 is basically the same as Embodiment 1 and involves symbols having the same meanings as Embodiment 1, and only differences therebetween will be described in the following.

Figure 9:
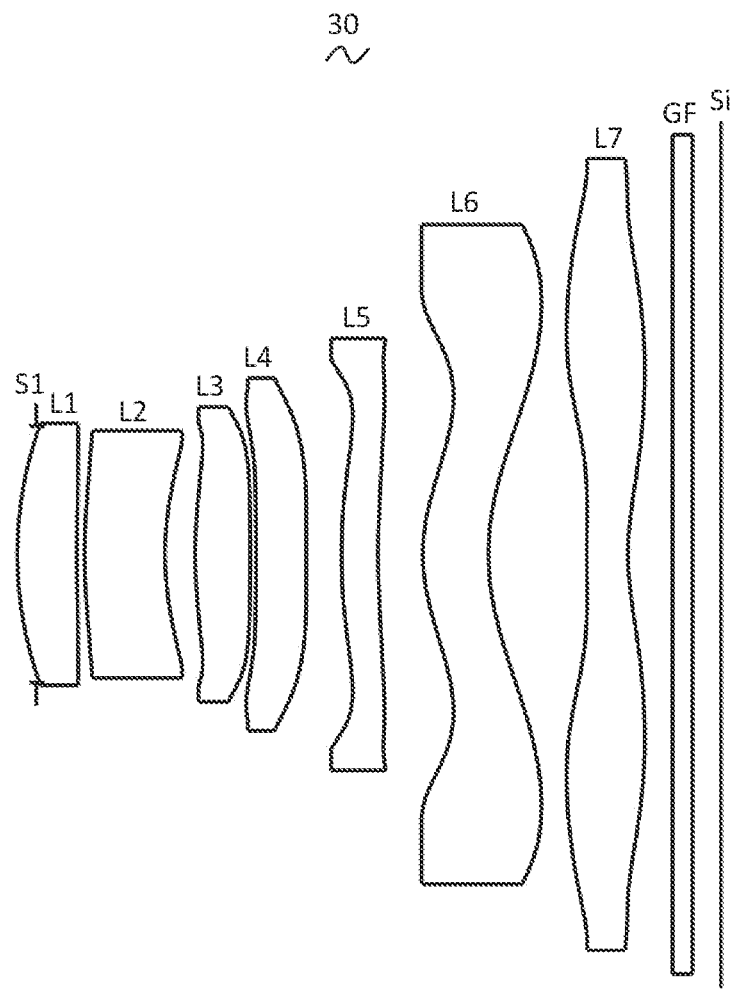
FIG. 9 is a schematic diagram of a structure of a camera optical lens in accordance with Embodiment 3 of the present invention.

FIG. 9 shows a schematic diagram of a structure of a camera optical lens 30 according to Embodiment 3 of the present invention.

Tables 9 and 10 show design data of a camera optical lens 30 in Embodiment 3 of the present invention.

TABLE 9

| | R | d | nd | vd |
|---|---|---|---|---|
| S1 | ∞ | d0 = −0.201 | | |
| R1 | 3.959 | d1 = 0.625 | nd1 1.5444 | v1 55.82 |
| R2 | 11.567 | d2 = 0.078 | | |
| R3 | 5.109 | d3 = 0.844 | nd2 1.6700 | v2 19.39 |
| R4 | 3.190 | d4 = 0.319 | | |
| R5 | 5.645 | d5 = 0.573 | nd3 1.5444 | v3 55.82 |
| R6 | −32.460 | d6 = 0.064 | | |
| R7 | −27.683 | d7 = 0.526 | nd4 1.5444 | v4 55.82 |
| R8 | −32.062 | d8 = 0.369 | | |
| R9 | 7.490 | d9 = 0.380 | nd5 1.5661 | v5 37.71 |
| R10 | 7.454 | d10 = 0.471 | | |
| R11 | 1.891 | d11 = 0.687 | nd6 1.5444 | v6 55.82 |
| R12 | 2.592 | d12 = 1.032 | | |
| R13 | 14.780 | d13 = 0.432 | nd7 1.5444 | v7 55.82 |
| R14 | 2.931 | d14 = 0.465 | | |
| R15 | ∞ | d15 = 0.210 | ndg 1.5168 | vg 64.17 |
| R16 | ∞ | d16 = 0.300 | | |

Table 10 shows aspherical surface data of each lens of the camera optical lens 30 in Embodiment 3 of the present invention.

TABLE 10

| | Conic coefficient | Aspheric surface coefficients | | | | |
|---|---|---|---|---|---|---|
| | k | A4 | A6 | A8 | A10 | A12 |
| R1 | 1.5527E−01 | −5.9860E−03 | 1.3624E−02 | −4.8205E−02 | 1.0262E−01 | −1.2965E−01 |
| R2 | −3.1022E+00 | −8.2636E−02 | 9.2173E−02 | −4.2091E−02 | −4.4355E−02 | 1.0711E−01 |
| R3 | −1.6828E+01 | −7.0640E−02 | 9.2355E−02 | −1.1339E−01 | 1.5685E−01 | −1.8015E−01 |
| R4 | −2.5121E+00 | −2.1675E−02 | −5.0406E−03 | 4.9233E−02 | −1.0210E−01 | 1.2643E−01 |
| R5 | 1.3595E+00 | −2.9137E−02 | 2.1076E−02 | −7.1832E−02 | 1.0789E−01 | −1.0879E−01 |
| R6 | 2.9969E+01 | 3.7957E−02 | −1.2306E−01 | 1.4732E−01 | −9.9814E−02 | 1.5108E−02 |
| R7 | −1.2989E+01 | 5.9403E−02 | −1.9057E−01 | 2.5659E−01 | −2.0749E−01 | 9.7173E−02 |
| R8 | −2.7936E+01 | 3.9981E−02 | −1.3736E−01 | 1.4683E−01 | −9.8207E−02 | 4.2529E−02 |
| R9 | 1.0941E+01 | 4.5756E−02 | −7.8196E−02 | 5.5622E−02 | −2.4699E−02 | 6.5012E−03 |

TABLE 10-continued

| | | | | | | |
|---|---|---|---|---|---|---|
| R10 | 7.1409E+00 | −4.5749E−02 | 2.9592E−02 | −2.4851E−02 | 1.8768E−02 | −9.0351E−03 |
| R11 | −2.9909E+00 | −4.8409E−02 | 2.1450E−02 | −1.3523E−02 | 5.2835E−03 | −1.2983E−03 |
| R12 | −5.4199E+00 | 6.8580E−03 | −5.3873E−03 | 9.6261E−04 | −6.4452E−05 | −3.6805E−06 |
| R13 | −3.0000E+01 | −8.6138E−02 | 3.3467E−02 | −6.6395E−03 | 8.2526E−04 | −6.8300E−05 |
| R14 | −6.9909E+00 | −5.3989E−02 | 1.9177E−02 | −4.2792E−03 | 6.1671E−04 | −5.8375E−05 |

| | Conic coefficient | Aspheric surface coefficients | | | |
|---|---|---|---|---|---|
| | k | A14 | A16 | A18 | A20 |
| R1 | 1.5527E−01 | 1.0013E−01 | −4.6453E−02 | 1.1889E−02 | −1.2914E−03 |
| R2 | −3.1022E+00 | −9.9506E−02 | 5.0048E−02 | −1.3412E−02 | 1.5070E−03 |
| R3 | −1.6828E+01 | 1.3581E−01 | −6.1360E−02 | 1.4837E−02 | −1.4470E−03 |
| R4 | −2.5121E+00 | −1.0181E−01 | 5.1081E−02 | −1.4521E−02 | 1.7872E−03 |
| R5 | 1.3595E+01 | 6.9055E−02 | −2.6855E−02 | 5.5871E−03 | −4.5528E−04 |
| R6 | 2.9969E+01 | 2.2476E−02 | −1.5550E−02 | 4.0984E−03 | −4.0163E−04 |
| R7 | −1.2989E+01 | −2.4204E−02 | 2.4783E−03 | 7.6474E−05 | −2.4740E−05 |
| R8 | −2.7936E+01 | −1.1780E−02 | 1.9922E−03 | −1.8418E−04 | 7.0183E−06 |
| R9 | 1.0941E+01 | −9.2859E−04 | 1.0516E−05 | 1.7912E−05 | −1.8419E−06 |
| R10 | 7.1409E+00 | 2.5349E−03 | −4.0641E−04 | 3.4825E−05 | −1.2466E−06 |
| R11 | −2.9909E+00 | 1.9962E−04 | −1.8258E−05 | 9.0019E−07 | −1.8348E−08 |
| R12 | −5.4199E+00 | 8.8877E−07 | −4.9728E−08 | 4.9247E−10 | 2.5686E−11 |
| R13 | −3.0000E+01 | 3.7902E−06 | −1.3572E−07 | 2.8251E−09 | −2.5822E−11 |
| R14 | −6.9909E+00 | 3.6064E−06 | −1.3936E−07 | 3.0398E−09 | −2.8430E−11 |

Table 11 and table 12 show Embodiment 3 design data of inflexion points and arrest points of respective lens in the camera optical lens 30 according to Embodiment 3 of the present invention.

TABLE 11

| | Number of Inflexion points | Inflexion point position 1 | Inflexion Point position 2 | Inflexion point position 3 | Inflexion point position 4 |
|---|---|---|---|---|---|
| P1R1 | 0 | / | / | / | / |
| P1R2 | 3 | 0.355 | 0.845 | 1.065 | / |
| P2R1 | 1 | 0.975 | / | / | / |
| P2R2 | 1 | 1.065 | / | / | / |
| P3R1 | 1 | 0.795 | / | / | / |
| P3R2 | 1 | 1.485 | / | / | / |
| P4R1 | 1 | 1.305 | / | / | / |
| P4R2 | 1 | 1.745 | / | / | / |
| P5R1 | 2 | 0.975 | 1.965 | / | / |
| P5R2 | 4 | 0.705 | 1.095 | 1.295 | 1.895 |
| P6R1 | 2 | 0.915 | 2.345 | / | / |
| P6R2 | 2 | 1.335 | 3.455 | / | / |
| P7R1 | 3 | 0.265 | 1.465 | 3.675 | / |
| P7R2 | 3 | 0.735 | 3.095 | 3.885 | / |

TABLE 12

| | Number of arrest points | Arrest point position 1 | Arrest point position 2 |
|---|---|---|---|
| P1R1 | 0 | / | / |
| P1R2 | 1 | 1.215 | / |
| P2R1 | 0 | / | / |
| P2R2 | 0 | / | / |
| P3R1 | 1 | 1.145 | / |
| P3R2 | 0 | / | / |
| P4R1 | 1 | 1.585 | / |
| P4R2 | 0 | / | / |
| P5R1 | 1 | 1.465 | / |
| P5R2 | 2 | 1.665 | 2.045 |
| P6R1 | 1 | 1.675 | / |
| P6R2 | 1 | 2.665 | / |
| P7R1 | 2 | 0.465 | 2.355 |
| P7R2 | 1 | 1.955 | / |

Figure 10:
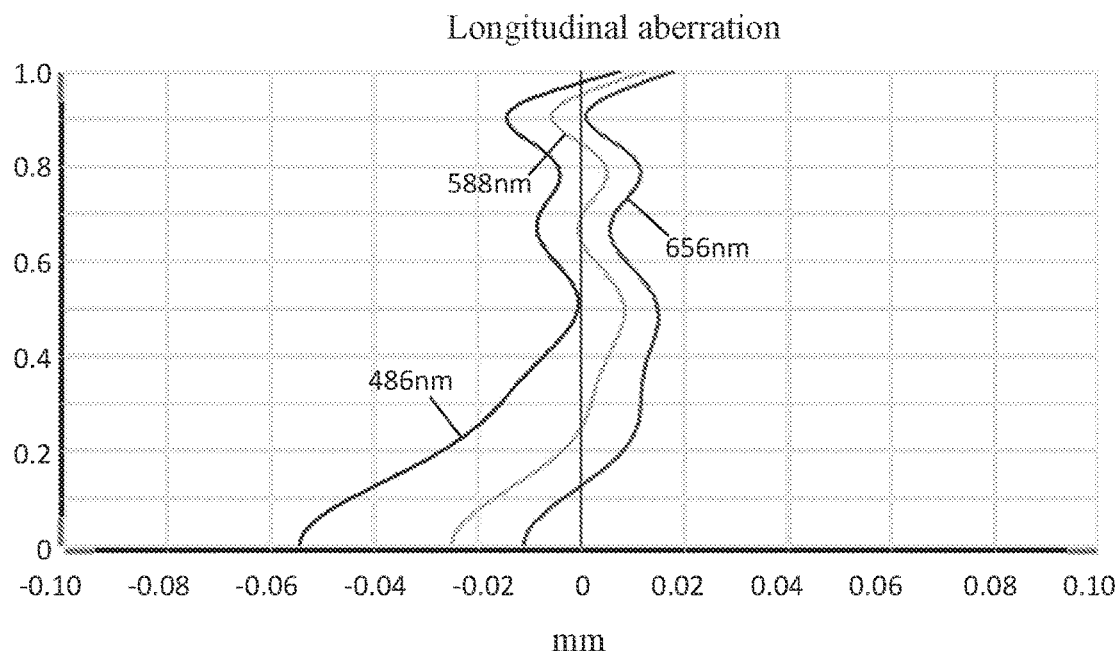
FIG. 10 is a schematic diagram of a longitudinal aberration of the camera optical lens shown in FIG. 9.
Figure 11:
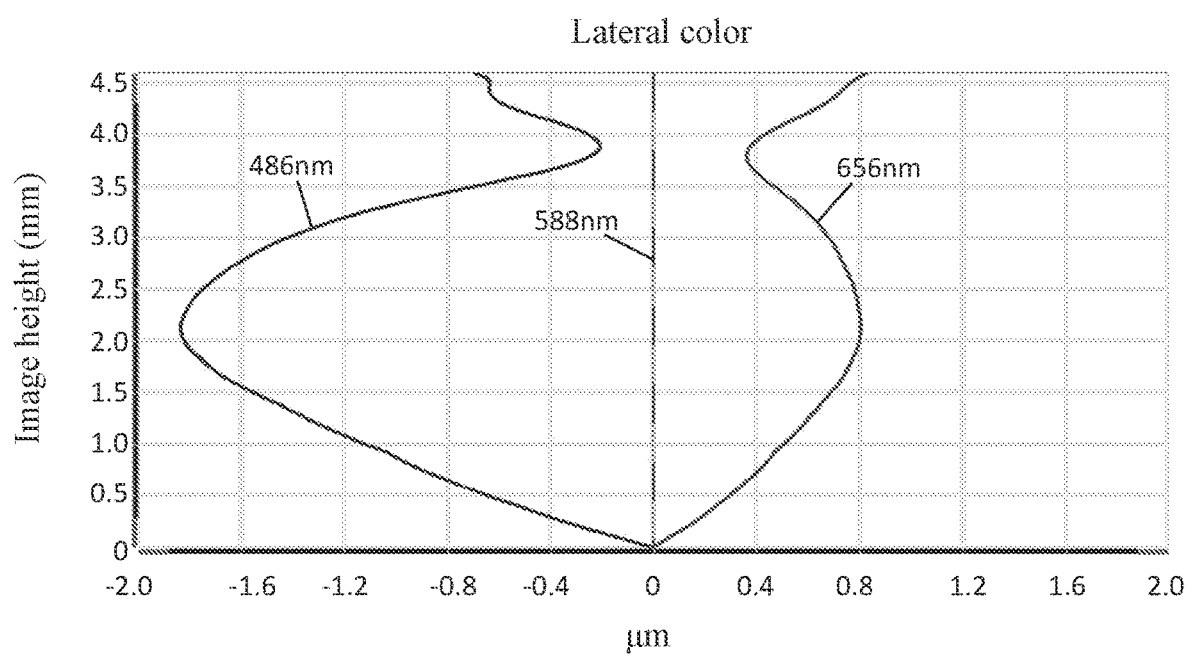
FIG. 11 is a schematic diagram of a lateral color of the camera optical lens shown in FIG. 9.
Figure 12:
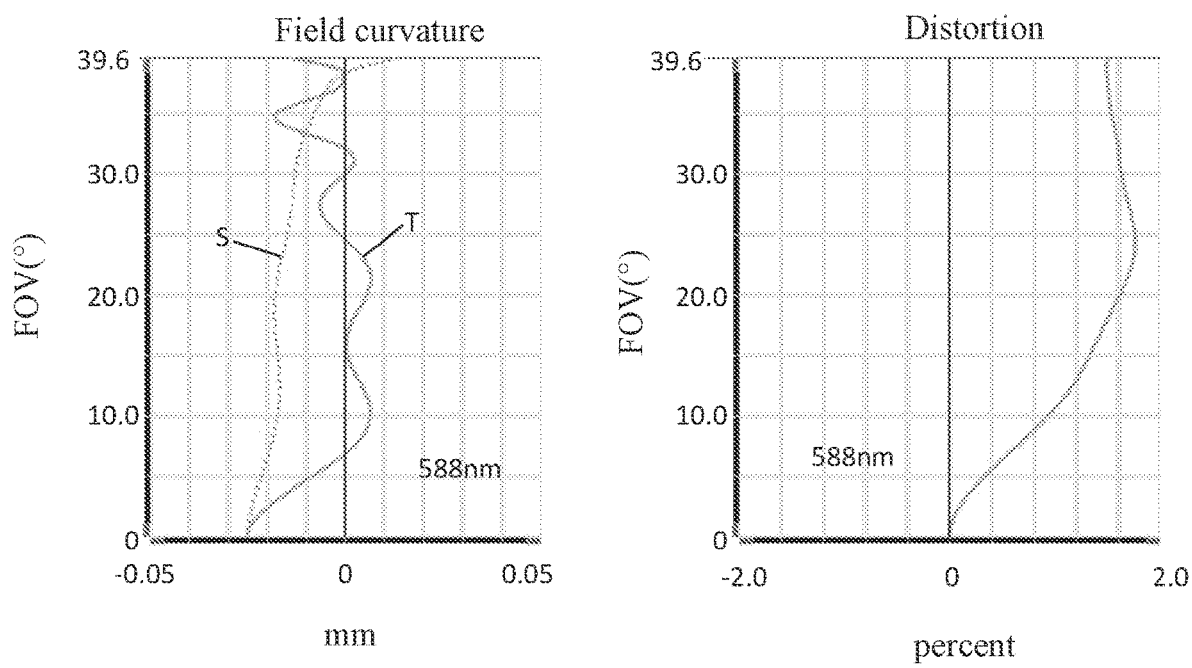
FIG. 12 is a schematic diagram of a field curvature and a distortion of the camera optical lens shown in FIG. 9.

FIG. 10 and FIG. 11 respectively illustrate a longitudinal aberration and a lateral color of light with wavelengths of 656 nm, 588 nm and 486 nm after passing the camera optical lens 30 according to Embodiment 3. FIG. 12 illustrates a field curvature and a distortion of light with a wavelength of 588 nm after passing the camera optical lens 30 according to Embodiment 3, in which a field curvature S is a field curvature in a sagittal direction and T is a field curvature in a tangential direction.

Table 13 in the following lists values corresponding to the respective conditions. In the present Embodiment 3 in order to satisfy the above conditions.

In the present embodiment, an entrance pupil diameter (ENPD) of the camera optical lens 30 is 2.721 mm. An image height of 1.0H is 4.595 mm. An FOV is 79.15°. Thus, the camera optical lens 30 satisfies design requirements of large aperture, ultra-thin and wide-angle while the on-axis and off-axis aberrations are sufficiently corrected, thereby achieving excellent optical characteristics.

TABLE 13

| Parameters and conditions | Embodiment 1 | Embodiment 2 | Embodiment 3 |
|---|---|---|---|
| f1/f | 1.32 | 1.65 | 1.98 |
| d1/d2 | 5.02 | 6.48 | 8.01 |
| d4/d6 | 1.02 | 2.99 | 4.98 |
| f | 6.518 | 5.595 | 5.441 |
| f1 | 8.636 | 9.232 | 10.747 |
| f2 | −11.491 | −14.055 | −15.386 |
| f3 | 8.213 | 9.269 | 8.880 |
| f4 | −40.981 | −131.139 | −388.755 |
| f5 | 494.357 | 1000.000 | 970.879 |
| f6 | 21.757 | 10.226 | 9.540 |
| f7 | −8.892 | −6.610 | −6.802 |
| f12 | 21.818 | 18.525 | 23.793 |
| FNO | 2.00 | 2.00 | 2.00 |
| TTL | 8.462 | 7.351 | 7.375 |
| IH | 4.595 | 4.595 | 4.595 |
| FOV | 69.68° | 77.86° | 79.15° |

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera optical lens with seven lenses, comprising, from an object side to an image side in sequence: a first lens having a positive refractive power, a second lens having a negative refractive power, a third lens having a positive refractive power, a fourth lens having a negative refractive power, a fifth lens having a positive refractive power, a sixth lens having a positive refractive power and a seventh lens having a negative refractive power; number of lenses with refractive power is 7; wherein the camera optical lens satisfies the following conditions:

$$1.30 \leq f1/f \leq 2.00;$$
$$5.00 \leq d1/d2 \leq 8.01;$$
and
$$1.00 \leq d4/d6 \leq 5.00;$$

$$-142.89 \leq f4/f \leq -4.19;$$
$$-27.29 \leq (R7 + R8)/(R7 - R8) \leq -1.42;$$
and
$$0.02 \leq d7/TTL \leq 0.11;$$

where,
f: a focal length of the optical camera lens;
f1: a focal length of the first lens;
f4: a focal length of the fourth lens;
R7: a central curvature radius of the object side surface of the fourth lens;
R8: a central curvature radius of the image side surface of the fourth lens;
d7: an on-axis thickness of the fourth lens;
TTL: a total optical length from an object side surface of the first lens of the camera optical lens to an image surface of the camera optical lens along an optical axis;
d1: an on-axis thickness of the first lens;
d2: an on-axis distance from an image side surface of the first lens to an object side surface of the second lens;
d4: an on-axis distance from an image side surface of the second lens to an object side surface of the third lens; and
d6: an on-axis distance from an image side surface of the third lens to an object side surface of the fourth lens.

2. The camera optical lens according to claim 1, wherein, the first lens has an object side surface being convex in a paraxial region and the image side surface of the first lens is concave in the paraxial region;
the camera optical lens further satisfies the following conditions:

$$-4.08 \leq (R1 + R2)/(R1 - R2) \leq -1.07;$$
and
$$0.04 \leq d1/TTL$$

where,
R1: a central curvature radius of the object side surface of the first lens; and
R2: a central curvature radius of the image side surface of the first lens.

3. The camera optical lens according to claim 2 further satisfying the following conditions:

$$-2.55 \leq (R1 + R2)/(R1 - R2) \leq -1.33;$$
and
$$0.07 \leq d1/TTL \leq 0.17.$$

4. The camera optical lens according to claim 1, wherein, the object side surface of the second lens is convex in a paraxial region and the image side surface of the second lens is concave in the paraxial region;
the camera optical lens further satisfies the following conditions:

$$-5.66 \leq f2/f \leq -1.18;$$
$$1.77 \leq (R3 + R4)/(R3 - R4) \leq 6.49;$$
and
$$0.02 \leq d3/TTL \leq 0.17;$$

where,
f2: a focal length of the second lens;
R3: a central curvature radius of the object side surface of the second lens;
R4: a central curvature radius of the image side surface of the second lens; and
d3: an on-axis thickness of the second lens.

5. The camera optical lens according to claim 4 further satisfying the following conditions:

$$-3.53 \leq f2/f \leq -1.47;$$
$$2.83 \leq (R3 + R4)/(R3 - R4) \leq 5.19;$$
and
$$0.03 \leq d3/TTL \leq 0.14.$$

6. The camera optical lens according to claim 1, wherein, the object side surface of the third lens is convex in a paraxial region and the image side surface of the third lens is convex in the paraxial region;
the camera optical lens further satisfies the following conditions:

$$0.63 \leq f3/f \leq 2.48;$$
$$-1.41 \leq (R5 + R6)/(R5 - R6) \leq -0.19;$$
and
$$0.04 \leq d5/TTL \leq 0.13;$$

where,
f3: a focal length of the third lens;
R5: a central curvature radius of the object side surface of the third lens;
R6: a central curvature radius of the image side surface of the third lens; and
d5: an on-axis thickness of the third lens.

7. The camera optical lens according to claim 6 further satisfying the following conditions:

$$1.01 \le f3/f \le 1.99;$$
$$-0.88 \le (R5+R6)/(R5-R6) \le -0.24;$$
and
$$0.06 \le d5/TTL \le 0.10.$$

8. The camera optical lens according to claim 1, wherein, the object side surface of the fourth lens is concave in the paraxial region and the fourth lens further has an image side surface being convex in the paraxial region.

9. The camera optical lens according to claim 8 further satisfying the following conditions:

$$-89.31 \le f4/f \le -5.24;$$
$$-17.05 \le (R7+R8)/(R7-R8) \le -1.77; \text{ and}$$
$$0.04 \le d7/TTL \le 0.09.$$

10. The camera optical lens according to claim 1, wherein, the fifth lens has an object side surface being convex in a paraxial region and an image side surface being concave in the paraxial region; the camera optical lens further satisfies the following conditions:

$$37.92 \le f5/f \le 268.10;$$
$$-641.90 \le (R9+R10)/(R9-R10) \le 1012.65;$$
and
$$0.03 \le d9/TTL \le 0.10;$$

where,
f5: a focal length of the fifth lens;
R9: a central curvature radius of the object side surface of the fifth lens;
R10: a central curvature radius of the image side surface of the fifth lens; and
d9: an on-axis thickness of the fifth lens.

11. The camera optical lens according to claim 10 further satisfying the following conditions:

$$60.68 \le f5/f \le 214.48;$$
$$-401.19 \le (R9+R10)/(R9-R10) \le 810.12;$$
and
$$0.04 \le d9/TTL \le 0.08.$$

12. The camera optical lens according to claim 1, wherein, the sixth lens has an object side surface being convex in a paraxial region and an image side surface being concave in the paraxial region; the camera optical lens further satisfies the following conditions:

$$0.88 \le f6/f \le 5.01;$$
$$-23.98 \le (R11+R12)/(R11-R12) \le -4.24;$$
and
$$0.05 \le d11/TTL \le 0.18;$$

where,
f6: a focal length of the sixth lens;
R11: a central curvature radius of the object side surface of the sixth lens;
R12: a central curvature radius of the image side surface of the sixth lens; and
d11: an on-axis thickness of the sixth lens.

13. The camera optical lens according to claim 12 further satisfying the following conditions:

$$1.40 \le f6/f \le 4.01;$$
$$-14.99 \le (R11+R12)/(R11-R12) \le -5.29;$$
and
$$0.07 \le d11/TTL \le 0.14.$$

14. The camera optical lens according to claim 1, wherein, the seventh lens has an object side surface being convex in a paraxial region and an image side surface being concave in the paraxial region;
the camera optical lens further satisfies the following conditions:

$$-2.73 \le f7/f \le -0.79;$$
$$0.63 \le (R13+R14)/(R13-R14) \le 5.49;$$
and
$$0.03 \le d13/TTL \le 0.09;$$

where,
f7: a focal length of the seventh lens;
R13: a central curvature radius of the object side surface of the seventh lens;
R14: a central curvature radius of the image side surface of the seventh lens; and
D13: an on-axis thickness of the seventh lens.

15. The camera optical lens according to claim 14 further satisfying the following conditions:

$$-1.71 \le f7/f \le -0.98;$$
$$1.01 \le (R13+R14)/(R13-R14) \le 4.39;$$
and
$$0.04 \le d13/TTL \le 0.07.$$

16. The camera optical lens according to claim 1 further satisfying the following condition: 1.66≤f12/f≤6.56;
where,
   f12: a combined focal length of the first lens and the second lens.

17. The camera optical lens according to claim 1, wherein an FNO of the camera optical lens is less than or equal to 2.06,
where,
   FNO: a ratio of an effective focal length of the camera optical lens to an entrance pupil diameter.

18. The camera optical lens according to claim 1, wherein an FOV of the camera optical lens is greater than or equal to 68.28°,
where,
   FOV: a field of view of the camera optical lens in a diagonal direction.

19. The camera optical lens according to claim 1 further satisfying the following condition:
TTL/IH 1.93;
where,
   IH: an image height of the camera optical lens.

* * * * *